United States Patent [19]

Schaefer

[11] 3,867,288

[45] Feb. 18, 1975

[54] PROCESS FOR TREATING CUTTING AND COOLING OILS

[76] Inventor: Richard J. Schaefer, 16852 Murray Hill Ave., Detroit, Mich. 48235

[22] Filed: Aug. 21, 1972

[21] Appl. No.: 282,271

Related U.S. Application Data

[63] Continuation-in-part of Ser. No. 123,145, March 11, 1971, Pat. No. 3,685,656.

[52] U.S. Cl. ............... 210/60, 210/63, 21/58, 252/397

[51] Int. Cl. .............................. C02b 3/08

[58] Field of Search ............ 210/63, 64, 192, 59–62, 210/167, 195; 21/58, 74 A; 134/10; 252/397; 204/136, 176, 188

[56] References Cited
UNITED STATES PATENTS

| | | | |
|---|---|---|---|
| 2,970,821 | 2/1961 | Axt | 210/192 X |
| 3,326,747 | 6/1967 | Ryan et al. | 210/64 X |
| 3,377,275 | 4/1968 | Michalski et al. | 210/64 |
| 3,448,045 | 6/1969 | Hess et al. | 210/64 X |
| 3,546,114 | 12/1970 | Dietz et al. | 134/10 X |
| 3,682,314 | 8/1972 | Blatter | 210/63 X |

*Primary Examiner*—Thomas G. Wyse
*Attorney, Agent, or Firm*—Barnes, Kisselle, Raisch & Choate

[57] ABSTRACT

A process for treating a contaminated water and soluble oil mixture used as a cutting and cooling aid in manufacturing operations by contacting the contaminated mixture with ozone to oxidize and destroy bacteria in the mixture. Preferably, the contaminated mixture is contacted with ozone more than once per day when the mixture is used in industrial manufacturing operations substantially continuously throughout the day.

24 Claims, No Drawings

3,867,288

PROCESS FOR TREATING CUTTING AND COOLING OILS

REFERENCE TO A COPENDING APPLICATION

This is a continuation-in-part of my copending U.S. patent application Ser. No. 123,145, filed Mar. 11, 1971 and entitled "Recirculating Ozone Treatment Apparatus," now U.S. Pat. No. 3,685,656.

This invention relates to the treatment of liquids with ozone and more particularly to a process for the treatment of contaminated cutting and cooling oils.

Mixtures of water and oil are used in many griding, cutting or machining, and steel manufacturing operations to increase tool life and cool workpieces which are being processed. A common cooling and lubricating mixture is an emulsion of approximately 80 to 94 parts by volume of water and 6 to 20 parts by volume of a so-called soluble oil. A typical so-called soluble oil has by weight 75–80 parts of a mineral, paraffinic, or napthenic base oil, 15–25 parts of an emulsifying agent such as petroleum sulfonate and 0–5 parts of animal or vegetable fats or oils or other esters to provide improved lubricity. Sometimes about 0–5 parts by weight of surface active agents such as sulphur, chlorine or phosphorus are added to improve lubricity under extreme pressure. Also, approximately 0–10 parts by weight of rust inhibitors such as ethylene glycol, sodium nitrite, and triethanolamine may be included.

These water and soluble oil mixtures are usually recirculated over the workpieces and associated tooling and thus reused many times. Some machines have their own individual system for recirculating these mixtures. However, in most large industrial plants these water and soluble oil mixtures are supplied to many machines or machining lines by a closed system with a large central reservoir. In both systems, these mixtures eventually become highly contaminated with bacteria and organic matter which produces offensive odors and becomes a health hazard. The family of coliform bacteria which cause many human diseases multiply readily in these water and soluble oil mixtures and are believed to be the primary producers of the offensive odors of such contaminated mixtures.

As water and soluble oil mixtures are used, they pick up lubricating, hydraulic and other non-water soluble oils and particulate contaminants from the machines performing operations on the workpieces. These lubricating, hydraulic and other non-soluble oils which are commonly referred to as tramp or free oils, do not have good cooling and machining or cutting properties and retard the effectiveness of the water and soluble oil mixture in cooling workpieces and increasing tool life. When the water and soluble oil mixture is in a large reservoir, the free oils will rise to the top of the mixture and float thereon particularly if the mixture moves very slowly through the reservoir or is stagnant therein for several hours, since these free oils are substantially non-soluble. In most large industrial plants, these free oils are skimmed from the surface of the water and soluble oil mixture when it is in the central reservoir to prolong the useful life and increase the effectiveness of the mixture.

Various chemical additives or bacteriacides have been developed to retard the growth of bacteria in these water and soluble oil mixtures. These bacteriacides usually have phenolic or formaldehyde donor bases. Typical phenolics are o-phenylphenol; sodium salt of o-phenylphenol; 2,3,,4,6-tetrachlorophenol; o-benzyl-p-chlorophenol; sodium salt of o-phenylphenol and sodium mercurio salicylate. Typical formaldehyde donors are 2-hydroxymethyl-2-nitro-1,3 propanediol; hexahydro-1,3,5-tris-2-hydroxyethyl-(s) triazine; hexahydro-1,3,5-tri-ethyl-(s) triazine; and 1-(3-chloro-allyl)-3,5,7-triaza-1-azonia-adamantane.

These bacteriacides are relatively expensive compared to the water and soluble oil mixtures (presently approximately 3–15 dollars per gallon) and the bacteria in contaminated water and soluble oil mixtures develop an immunity to these bacteriacides which requires the use of different types of bacteriacides and increasing the concentration of the bacteriacides to control the bacteria. In sufficient concentrations, these bacteriacides become toxic and are a hazard to the health of people exposed to water and soluble oil mixtures with bacteriacides therein. Thus, even when bacteriacides or chemical additives are used with water and soluble oil mixtures, such mixtures become both toxic and contaminated and, hence, eventually the storage reservoir must be emptied and the contaminated mixtures disposed of. Due to the phenolics or formaldehyde from the bacteriacides in these water and soluble oil mixtures as well as the bacteria therein, it is difficult to dispose of these contaminated mixtures in a safe and ecologically acceptable manner.

Previously, it has always been believed that the treatment of contaminated water and soluble oil mixtures with ozone would destroy the bond retaining the soluble oil in emulsion in the water and oxidize the soluble oil. In fact, expired Hartman U.S. Pat. No. 2,089,793 suggests the treatment of drying oils with ozone to increase the viscosity thereof by the formation of oxidation products to produce partially pre-dried oils which accelerate the ultimate drying time of the oil when used in the production of paints, varnishes, linoleum and the like and expired Kellens, U.S. Pat. No. 2,260,910 suggests that it was previously known to use ozone to bleach or oxidize palm and bamboo ois for decolorization prior to saponification in the making of soap. However, it has been discovered that the treatment of contaminated water and soluble oil mixtures with a few parts per million by weight of ozone reduces the amount of free oils therein and effectively controls and reduces to a safe level the total and coliform bacteria counts thereof without having any detectable adverse effect on the soluble oil therein. The ozone oxidizes and destroys bacteria and most other organic matter in contaminated water and soluble oil mixtures and is particularly effective in eliminating offensive odors and destroying the coliform bacteria which cause many human diseases. The ozone also reduces the toxicity of the phenolic contaminants as well as any cyanide or cyanate in the mixture so that after the oil is removed the remainder of the mixture could be discharged into natural water sources without adverse ecological and environmental effects. The reduction of toxicity proceeds more rapidly if the Ph value of the water and soluble oil mixtures is controlled so that it is approximately neutral.

Objects of this invention are to provide a process for treating contaminated water and soluble cutting and cooling oil mixtures which (1) allows such mixtures to be reused indefinitely, (2) eliminates offensive odors and the need for costly bacteriacides, (3) reduces health hazards, disposal problems and adverse ecological and environmental effects, (4) substantially decreases the proportion of free oil, (5) is easily applicable and (6) requires comparatively little capital investment and labor in the application and utilization thereof.

In the process of this invention, ozone which is an allatropic form of oxygen is contacted with contaminated water and soluble oil mixtures to destroy the bacteria and offensive odors thereof. The amount of ozone which should be used is dependent on the rate at which bacteria grows in a water and soluble oil mixture and the maximum permissible level of bacteria in the mixture. The rate of growth of bacteria in the mixture varies with the extent of use of the mixture and the particular environment in which it is used. For example, all other things being equal, the bacteria will grow more rapidly where machining operations raise the water and soluble oil mixture to a higher temperature. Similarly, the acceptable maximum bacteria level as commonly measured by a plate count of the bacteria varies depending on the conditions under which persons are exposed to the contaminated water and soluble oil mixtures. For example, if workers are completely soaked during most of their work period in the contaminated water and soluble oil mixture, the maximum bacteria safety level must be lower than where the operating conditions are such that the workers skin is only occasionally in contact with the contaminated mixture. Industrial plants usually develop their own maximum bacteria safety levels in view of their own particular operating equipment and environment and the health histories of their employees working in this environment.

In the process of this invention, it is preferable to contact with ozone the contaminated water and soluble oil mixture in a cooling system more than once per 24-hour day during which the mixture is used in manufacturing and machining operations substantially continuously. It is believed that in most industrial operations, contacting contaminated mixtures with ozone from one to twenty times per 24-hour day while injecting ozone into the mixtures at a rate of one to twenty parts per million by weight will destroy substantial portions of the bacteria in the contaminated mixtures and keep the bacteria plate count low enough so the mixtures do not present safety hazards or have offensive odors when used in manufacturing and machining operations substantially throughout the day. It is believed to be preferable in most industrial applications to contact the contaminated mixtures with ozone from about two to ten times per day while injecting the ozone into the contaminated mixtures at a rate of about 1½ to 10 parts per million by weight. Contacting the contaminated mixtures with ozone five to six times per day while injecting ozone into the mixtures at a rate of 3 to 4 parts per million by weight has in practice proved highly effective as set forth in greater detail in Example 1 hereafter.

Generally, it is preferably to inject the ozone into the water and soluble oil mixture at a lower rate while providing a greater number of contacts of the mixture with ozone per day rather than injecting the ozone at a higher rate with only one contact per day of the mixture with ozone. The preferable rate of injection of ozone into a contaminated water and soluble oil mixture and the number of contacts of the mixture with ozone per day for each particular industrial application can be emperically determined by monitoring the bacteria level, such as by periodically taking samples and making bacteria plate counts thereof, in order to arrive at a satisfactory rate of ozone injection and number of contacts per day which will maintain a safe bacteria level in the mixture. It is believed that in most industrial applications, the injection of ozone at a rate of one to three parts per million by weight with one to two contacts per 24-hour day where the mixture is substantially continuously used in manufacturing operations will prevent the bacteria in the mixture from producing offensive odors. Thus, these rates of contact and ozone injection represent approximately the minimum desirable rates for treatment by the process of this invention.

In using the process of this invention, it is believed to be preferable to inject ozone into contaminated mixtures for contact therewith by using one or more venturi tubes. The ozone and contaminated mixture can be discharged from the venturi tubes into a holding chamber or tank. The contaminated mixture preferably flows or is withdrawn from the holding chamber or tank at such a rate in relation to the volume of the mixture in the holding chamber or tank that the mixture therein is turned over once approximately ever 1½ to 2½ minutes. By recirculating the contaminated mixture through the venturi tubes, the mixture can be contacted with ozone more that once per day with the number of contacts being dependent on the number of times per day the mixture is circulated through the venturi tubes and injected with ozone. A suitable apparatus for contacting ozone with contaminated water and soluble oil mixtures more than once per day and for injecting ozone into the mixture through venturi tubes is fully disclosed and claimed in Schaefer U.S. patent application Ser. No. 123,145, entitled "Recirculating Ozone Treatment Apparatus," filed Mar. 11, 1971, and issued Aug. 22, 1972 as U.S. Pat. No. 3,685,656 which is incorporated herein by reference and, hence, a suitable contacting and injecting apparatus will not be described herein in further detail. Ozone can be produced by passing oxygen or air containing oxygen between spaced electrically charged ground and high potential electrodes. Suitable apparatus for producing ozone is fully disclosed and claimed in Schaefer U.S. patent application Ser. No. 198,937, entitled "Ozone Generator" and filed Nov. 15, 1971 as a continuation of copending application Ser. No. 801,674, filed Feb. 24, 1969 which is incorporated herein by reference and, hence, will not be described herein in further detail.

Treatment of contaminated water and soluble oil mixtures with this process substantially reduces the proportion of tramp or free oils carried by the mixture. It is theorized that this process emulsifies some of the free oil into a stable emulsion with the water of the mixture under the influence of the emulsifying agent in the soluble oil of the mixture. It is also theorized that the injection of ozone more than once a day causes some of the free oil which is not emulsified to coagulate from smaller to larger masses which will rise more readily to the top of the mixture where they can be removed by skimming. Regardless of the theroretical explanation, it has been found in practice, that the amount of free oil in the water and soluble oil mixture is substantially decreased.

The following examples of applications of this process are provided by way of illustration and not as a limitation on the scope of this invention.

EXAMPLE 1

The process of this invention was used to treat a contaminated water and soluble oil mixture used as a coolant and cutting aid on an automated line for machining cast iron brake drums. This machining line had a coolant system with a 17,500 gallon central reservoir which circulated the mixture from the reservoir over the brake drum workpieces and tooling of the machining line and returned the mixture to the reservoir at a rate of approximately 99,600 gallons per hour so that the mixture was circulated through the reservoir approximately 135 times per 24-hour day during which the machining line operated substantially continuously. The mixture was initially made up by volume of 94 parts water and 6 parts of Shell MS-105 soluble oil commercially available from Shell Oil Co., 1700 West Eight Mile Road, Detroit, Mich. Due to evaporation of water from this mixture and its accumulation of free oil during use in the machining line, the mixture had by volume, 74 parts water, 12.5 parts free oil and 13.5 parts soluble oil when treatment with the process of this invention began. This mixture had a total bacteria plate count of approximately 200 million per 100 milliliters of mixture and a coliform bacteria plate count of 4 million per 100 milliliters of mixture when treatment with the process of this invention began. The mixture was treated and monitored over a period of approximately 4 months during which time the rate of ozone injection was varied from approximately 14 to 3 parts per million by weight and the number of contacts of the mixture with ozone was varied from approximately one to five times per day. During this period the only addition to the mixture was additional water and Shell MS-105 soluble oil in a proportion by volume of 94 parts water and 6 parts soluble oil to compensate for loss of the contaminated mixture due to evaporation and carrying away of the contaminated mixture by the workpieces. No bacteriacides or other chemicals were added to the mixture during this four month period although commercially available bacteriacides such as Microbiacide 106 and 212 sold by Calgon Corp., 17251 West Twelve Mile Road, Southfield, Mich. were added as needed prior to the beginning of the 4 month period. Treatment of this mixture by the process of this invention during the four month period eliminated offensive odors and maintained both the total and coliform bacteria plate counts at safe levels which did not present any health hazard to workers running the machining line. The average total bacteria plate count during the treatment period was approximately 150 million per 100 milliliters of the mixture and the average coliform plate count during the treatment period was approximately 900,000 per 100 milliliters of the mixture. These total and coliform bacteria plate counts are approximately 75 and 55 percent respectively below the maximum bacteria safety levels established by some large industrial manufacturers for this type of machining line based on the history of the health of employees working on and near this type of machining line and the average bacteria level at which contaminated mixtures begin to produce offensive odors. By the end of the four month period, the free oil carried by the mixture was reduced approximately 40 percent or from about 13.5 parts to about 7.3 parts by volume of the total mixture of water, free oil and soluble oil.

EXAMPLE 2

In a steel mill, a mixture by volume of 20 parts water and 5 parts Quaker Soluble 22-6 soluble oil was used as a coolant in a grinding operation for 21 days of substantially continuously operation with additional water and soluble oil in the above proportions added on the sixth day to make up for losses of the mixture. A sample of this mixture taken at the end of this period had a total bacteria plate count of 130 million per 100 milliliters, a very rancid odor, and consisted by volume of approximately 3.5 parts total free oil, 30 parts soluble oil and 66.5 parts water. The free oil alone consisted by volume of 85 percent mineral oil and 15 percent soluble oil. This sample was treated in accordance with the process of this invention by contacting the contaminated mixture with ozone approximately 30 times per hour for 1½ hours while injecting the ozone at the rate of approximately eight parts per million by weight. Treatment of this mixture by the process of this invention reduced the total bacteria plate count to 90,000 per 100 milliliters of the mixture, decreased the free oil to approximately 0.5 percent by volume of the total mixture and eliminated the rancid odor of the mixture. Immediately after treatment of this mixture by the process of this invention, there was no visible free oil on the surface of the mixture and the mixture remained stagnant for five days before even a trace of free oil appeared. After the treated mixture remained stagnant for two weeks, the amount of free oil appearing on the surface of the mixture was 0.5 percent of the total volume of the mixture.

EXAMPLE 3

A mixture by volume of approximately 80 parts water and 20 parts Shell MS-105 soluble oil was used with a Bullard machine as a coolant and cutting aid in machining cast iron workpieces substantially continuously for about 2 weeks. A sample of this mixture after standing for a few days had a total bacteria plate count of approximately 290 million per 100 milliliters of the mixture, a coliform bacteria plate count of approximately 220,000 per 100 milliliters of the mixture and consisted by volume of approximately 14 parts free oil, 20 parts soluble oil and 66 parts water. The sample of this mixture was treated by the process of this invention for 7 hours by contacting the mixture with ozone approximately seven times per hour while injecting the ozone at a rate of approximately 4 parts per million by weight. The table below indicates the bacteria count and the amount of free oil in samples of the mixture taken during treatment thereof at the times indicated in the table.

| Sample No. | Lapsed Time During Treatment | Total Bacteria Plate Count per 100 Milliliters of the Mixture | Coliform Bacteria Plate Count per 100 Milliliters of the Mixture | Free Oil as a % of Volume of the Mixture | Soluble Oil as a % of Volume of the Mixture |
|---|---|---|---|---|---|
| 1 | 0 | $2.9 \times 10^8$ | $2.2 \times 10^5$ | 14 | 20 |
| 2 | 5 min. | $2.1 \times 10^8$ | $1.4 \times 10^5$ | | |
| 3 | 10 min. | $1.8 \times 10^8$ | $1.1 \times 10^5$ | | |
| 4 | 15 min. | $3.6 \times 10^7$ | $1.2 \times 10^4$ | 8 | 20 |
| 5 | 20 min. | $7.4 \times 10^6$ | $6.0 \times 10^3$ | | |

-Continued

| Sample No. | Lapsed Time During Treatment | Total Bacteria Plate Count per 100 Milliliters of the Mixture | Coliform Bacteria Plate Count per 100 Milliliters of the Mixture | Free Oil as a % of Volume of the Mixture | Soluble Oil as a % of Volume of the Mixture |
|---|---|---|---|---|---|
| 6 | 25 min. | $3.3 \times 10^6$ | $9.0 \times 10^3$ | | |
| 7 | 2 hrs. | $3.0 \times 10^5$ | $3.0 \times 10^3$ | 4 | 19 |
| 8 | 3 hrs. | $3.0 \times 10^5$ | $1.0 \times 10^3$ | | |
| 9 | 4 hrs. | $1.1 \times 10^5$ | $2.0 \times 10^3$ | | |
| 10 | 5 hrs. | $1.2 \times 10^4$ | $1.0 \times 10^3$ | | |
| 11 | 6 hrs. | $6.7 \times 10^4$ | $9.5 \times 10^2$ | | |
| 12 | 7 hrs. | $9.8 \times 10^3$ | $9.0 \times 10^2$ | | |

After this mixture had been treated for only 15 minutes by the process of this invention, the total bacteria plate count decreased more than 87 percent, the coliform bacteria plate count decreased more than approximately 94 percent, and the volume of free oil decreased more than 40 percent. Moreover, treatment of this mixture for 2 hours decreased the volume of free oil more than 70 percent.

It is believed that these three exampes illustrate that it is preferable in treating contaminated water and soluble oil mixtures with the process of this invention to in general use higher rates of contact of the ozone with contaminated mixtures and lower ozone injection rates rather than vice versa. It is also believed that for each contact rate in treating a particular contaminated water and soluble oil mixture, there is a point beyond which increased ozone injection rates do not substantially improve the effectiveness of this process in treating the contaminated mixture. Hence, use of ozone injection rates in excess of this point are beelieved to be unnecessary and needlessly increase the cost of using this process in treating the contaminated mixtures. This point for a particular contaminated mixture and contact rate can be emperically determined by comparing the bacteria plate counts of samples of the contaminated liquid each treated for the same period of time at various ozone injection rates.

The process of this invention reduces the total bacteria count in contaminated cutting and cooling oil mixtures sufficiently to greatly increase the useful life of such mixtures and is believed to make such mixtures reusable indefinitely. This process also eliminates the offensive odors of contaminated cutting and cooling oil mixtures and the need to add costly bacteriacides to the mixture. Treatment by this process also greatly reduces and substantially eliminates the health hazards and adverse ecological and environmental effects of contaminated cutting and cooling oil mixtures. Since little labor and comparatively inexpensive equipment is used in practicing this process, it is commercially practical, economical and easily applicable.

I claim:

1. A process for retarding the growth of bacteria in a mixture of water and soluble oil used in industrial operations as a coolant and/or lubricant for workpieces comprising repeatedly circulating the mixture over the workpieces and repeatedly contacting the mixture with sufficient ozone to maintain the bacteria level in the mixture below a predetermined maximum bacteria level.

2. The process of claim 1 comprising the step of contacting the mixture with ozone more than once per day.

3. The process of claim 2 which also comprises the step of monitoring the bacteria level of the mixture to determine if the bacteria level has exceeded the predetermined maximum bacteria level.

4. The process of claim 3 which also comprises the step of adjusting the rate of contacting the mixture with ozone in the range of from more than one to twenty times per day to maintain the bacteria level of the mixture below the predetermined maximum bacteria level.

5. The process of claim 3 which also comprises the steps of adjusting the amount of ozone to contact the mixture to within the range of 1 to 20 parts per million and of adjusting the rate of contacting the mixture with ozone in the range of more than one to 20 times per day to maintain the bacteria level of the mixture below the predetermined maximum bacteria level.

6. The process of claim 2 wherein the mixture is contacted with ozone at the rate of at least 1 part per million by weight.

7. The process of claim 2 wherein the mixture is contacted with ozone at the rate of at least 1½ parts per million by weight.

8. The process of claim 2 wherein the mixture is contacted with ozone at the rate of 1 to 20 parts per million by weight.

9. The process of claim 2 wherein the mixture is contacted with ozone at the rate of 1½ to 10 parts per million by weight.

10. The process of claim 1 which also comprises the step of monitoring the bacteria level of the mixture to determine if the bacteria level has exceeded the predetermined maximum bacteria level.

11. The process of claim 10 which also comprises the step of adjusting the amount of ozone to contact the mixture to within the range of 1 to 20 parts per million by weight to maintain the bacteria level of the mixture below the predetermined maximum bacteria level.

12. The process of claim 1 wherein the mixture is contacted with ozone at the rate of at least 1 part per million by weight.

13. The process of claim 1 wherein the mixture is contacted with ozone at the rate of at lest 1½ parts per million by weight.

14. The process of claim 1 wherein the mixture is contacted with ozone at the rate of at least 3 parts per million by weight.

15. The process of claim 1 wherein the mixture is contacted with ozone at the rate of 1 to 20 parts per million by weight.

16. The process of claim 1 wherein the mixture is contacted with ozone at the rate of 1½ to 10 parts per million by weight.

17. The process of claim 1 comprising contacting the mixture with ozone from 1 to 20 times per day.

18. The process of claim 1 comprising contacting the mixture with ozone from 2 to 10 times per day.

19. The process of claim 1 comprising contacting the mixture with ozone from 5 to 6 times per day.

20. The process of claim 1 comprising contacting the mixture with ozone from 1 to 20 times per day at a rate of at least 1 part per million by weight.

21. The process of claim 1 comprising contacting the mixture with ozone from 2 to 10 times per day at a rate of at least 1 part per million by weight.

22. The process of claim 1 comprising contacting the mixture with ozone from 1 to 20 times per day at a rate of 1½ to 10 parts per million by weight.

23. The process of claim 1 comprising contacting the mixture with ozone from 2 to 10 times per day and at a rate of 1½ to 10 parts per million by weight.

24. The process of claim 1 comprising contacting the mixture with ozone from 5 to 6 times per day and at a rate of 3 to 4 parts per million by weight.

* * * * *

UNITED STATES PATENT OFFICE
CERTIFICATE OF CORRECTION

PATENT NO. : 3,867,288
DATED : February 18, 1975
INVENTOR(S) : Richard J. Schaefer It is certified that error appears in the above-identified patent and that said Letters Patent are hereby corrected as shown below:

Column 1, line 12, delete "griding" and insert "grinding".

Column 2, line 41, delete "ois" and insert "oils".

Column 3, line 58, delete "preferably" and insert "preferable".

Column 4, line 24, delete "ever" and insert "every".

Column 7, line 36, delete "beelieved" and insert "believed".

Signed and Sealed this twenty-second Day of July 1975

[SEAL]

Attest:

RUTH C. MASON
Attesting Officer

C. MARSHALL DANN
Commissioner of Patents and Trademarks